United States Patent
Chojecki et al.

(10) Patent No.: US 10,946,922 B2
(45) Date of Patent: Mar. 16, 2021

(54) RIDE-ON TOY VEHICLE CONFIGURED TO TILT AND DRIFT

(71) Applicant: Mattel, Inc., El Segundo, CA (US)

(72) Inventors: Nicholas Chojecki, West Seneca, NY (US); Peter Truman vom Scheidt, Jr., Elma, NY (US); Kurt J. Huntsberger, Arcade, NY (US); William R. Howell, Arcade, NY (US); Jon Paul Castiglione, Orchard Park, NY (US)

(73) Assignee: Mattel, Inc., El Segundo, CA (US)

( * ) Notice: Subject to any disclaimer, the term of this patent is extended or adjusted under 35 U.S.C. 154(b) by 254 days.

(21) Appl. No.: 15/895,008

(22) Filed: Feb. 13, 2018

(65) Prior Publication Data
US 2018/0229796 A1 Aug. 16, 2018

Related U.S. Application Data

(60) Provisional application No. 62/459,745, filed on Feb. 16, 2017.

(51) Int. Cl.
*B62K 5/10* (2013.01)
*B62D 9/02* (2006.01)
(Continued)

(52) U.S. Cl.
CPC ................. *B62K 5/10* (2013.01); *B62D 9/02* (2013.01); *B62K 5/027* (2013.01); *B62K 5/05* (2013.01);
(Continued)

(58) Field of Classification Search
CPC ... B62D 3/00; B62D 3/02; B62D 7/18; B62D 9/02; B62D 9/04; B62K 5/02; B62K 5/027; B62K 5/05; B62K 5/10; B62K 9/02
See application file for complete search history.

(56) References Cited

U.S. PATENT DOCUMENTS 1,204,138 A * 11/1916 Dubert ................. B62D 3/02
74/497
1,764,730 A * 6/1930 Kraeft ................. B62D 3/02
280/93.51
(Continued)

FOREIGN PATENT DOCUMENTS

CN 204197005 U 3/2015
DE 3003707 A1 8/1981
(Continued)

OTHER PUBLICATIONS

Hagerman, John. "Pointed the Right Way", Wayback Machine Internet Archive [online], [Retrieved on Apr. 2, 2016]. Retrieved from the Internet < URL: https://web.archive.org/web/20160402141214/http://www.ozebiz.com.au/racetech/theory/align.html >. (Year: 2016).*
(Continued)

*Primary Examiner* — Barry Gooden, Jr.
(74) *Attorney, Agent, or Firm* — Edell, Shapiro & Finnan, LLC

(57) ABSTRACT

Embodiments of the present invention relate to a battery powered ride-on toy vehicle. The ride-on vehicle includes a main body, a front wheel assembly, and a steering assembly. The front wheel assembly is angularly offset from the main body so that steering the vehicle into a turn with the steering assembly creates a camber angle in the wheels of the front wheel assembly and tilts the main body into a turn. The ride-on vehicle may also include a rear wheel assembly and a drive assembly configured to drive any wheels included in the front wheel assembly and the rear assembly. The toy vehicle can also drift through turns while tilting into the turn.

17 Claims, 11 Drawing Sheets

(51) Int. Cl.
  *B62K 9/02* (2006.01)
  *B62K 5/027* (2013.01)
  *B62K 5/05* (2013.01)
  *B62M 7/12* (2006.01)
  *B62K 5/08* (2006.01)
  *B62K 5/06* (2006.01)

(52) U.S. Cl.
  CPC .......... *B62K 5/06* (2013.01); *B62K 5/08* (2013.01); *B62K 9/02* (2013.01); *B62M 7/12* (2013.01); *B60G 2200/44* (2013.01); *B60G 2300/122* (2013.01)

(56) References Cited

U.S. PATENT DOCUMENTS

| | | | | |
|---|---|---|---|---|
| 2,481,683 | A * | 9/1949 | Jiri Polacek | B62K 5/05 280/282 |
| 3,423,104 | A * | 1/1969 | Cecil | B62D 7/18 280/93.512 |
| 3,842,928 | A | 10/1974 | Kishi | |
| 4,088,199 | A * | 5/1978 | Trautwein | B60G 21/007 180/209 |
| 4,399,883 | A | 8/1983 | Todokoro | |
| 4,460,197 | A * | 7/1984 | Rogers | B62D 7/00 280/779 |
| 4,475,618 | A | 10/1984 | Kennedy | |
| 4,560,022 | A | 12/1985 | Kassai | |
| 4,562,893 | A | 1/1986 | Cunard | |
| 4,705,284 | A * | 11/1987 | Stout | A61G 5/025 280/250.1 |
| RE36,225 | E | 6/1999 | Harris | |
| 5,928,020 | A | 7/1999 | Bishop, Jr. | |
| 6,095,268 | A | 8/2000 | Jones, Jr. | |
| 6,382,646 | B1 * | 5/2002 | Shaw | B62K 3/002 280/11.28 |
| 6,685,201 | B1 * | 2/2004 | Smith, III | A63C 17/0026 280/288.1 |
| 6,771,034 | B2 | 8/2004 | Reile | |
| 6,860,512 | B2 | 3/2005 | Lawson, Jr. | |
| 7,152,868 | B1 * | 12/2006 | Minot | B62D 9/02 280/267 |
| 7,374,228 | B2 | 5/2008 | Whale | |
| 7,445,075 | B2 | 11/2008 | Ozawa | |
| 7,487,985 | B1 * | 2/2009 | Mighell | B62K 5/027 180/210 |
| 7,591,335 | B2 | 9/2009 | Howell | |
| 7,665,749 | B2 * | 2/2010 | Wilcox | B60G 3/01 280/124.103 |
| 7,938,218 | B2 * | 5/2011 | Howell | B60G 3/01 180/197 |
| 8,141,668 | B2 | 3/2012 | Huntsberger | |
| 9,033,356 | B2 | 5/2015 | Xiao | |
| 9,102,375 | B2 | 8/2015 | Kermani | |
| 9,257,926 | B2 | 2/2016 | Pettigrew | |
| 9,610,998 | B1 * | 4/2017 | LaBonty | B62K 5/08 |
| 10,501,119 | B2 * | 12/2019 | Doerksen | B60G 17/018 |
| 10,696,345 | B2 * | 6/2020 | Vidolov | B62K 5/01 |
| 2001/0042968 | A1 * | 11/2001 | Andrews | B62K 3/005 280/220 |
| 2004/0118625 | A1 | 6/2004 | Witthun | |
| 2005/0095953 | A1 | 5/2005 | Hoeting | |
| 2005/0176344 | A1 | 8/2005 | Bruder | |
| 2006/0054370 | A1 * | 3/2006 | Sugioka | B62D 61/065 180/211 |
| 2006/0170184 | A1 | 8/2006 | Lan | |
| 2006/0231303 | A1 | 10/2006 | Fobean | |
| 2006/0278455 | A1 | 12/2006 | Padginton | |
| 2006/0279058 | A1 | 12/2006 | Padginton | |
| 2007/0128976 | A1 | 6/2007 | Accerenzi | |
| 2007/0209854 | A1 * | 9/2007 | Ho | B62K 5/05 180/210 |
| 2007/0290470 | A1 * | 12/2007 | Taylor | B62K 5/05 280/62 |
| 2008/0115994 | A1 * | 5/2008 | Martini | B62D 9/02 180/210 |
| 2008/0258416 | A1 * | 10/2008 | Wilcox | B60G 3/01 280/124.103 |
| 2009/0108555 | A1 * | 4/2009 | Wilcox | B60G 7/008 280/93.51 |
| 2009/0224524 | A1 * | 9/2009 | Rathsack | B62K 3/005 280/778 |
| 2009/0280718 | A1 * | 11/2009 | Willett | A63H 17/18 446/470 |
| 2010/0194068 | A1 * | 8/2010 | Henderson | B62D 9/02 280/124.103 |
| 2011/0233885 | A1 * | 9/2011 | McMillan | B62K 3/002 280/89.11 |
| 2011/0241302 | A1 * | 10/2011 | Lovley, II | B62K 3/002 280/87.041 |
| 2013/0214503 | A1 * | 8/2013 | Chiuppani | B60G 5/025 280/124.103 |
| 2014/0042717 | A1 * | 2/2014 | Chan | B62K 3/002 280/5.509 |
| 2014/0167375 | A1 * | 6/2014 | Stark | B62D 3/00 280/86.751 |
| 2015/0130160 | A1 | 5/2015 | Li | |
| 2016/0296848 | A1 * | 10/2016 | Taylor | B60L 3/0092 |
| 2018/0022411 | A1 * | 1/2018 | Kistemaker | B62K 5/05 180/208 |
| 2018/0072372 | A1 * | 3/2018 | Jones | B62M 1/16 |
| 2018/0362109 | A1 * | 12/2018 | Vidolov | B62K 5/10 |

FOREIGN PATENT DOCUMENTS

| | | |
|---|---|---|
| EP | 0280920 A1 | 9/1988 |
| WO | 2010018252 A1 | 2/2010 |

OTHER PUBLICATIONS

Machine translation of CN 204197005 U (Year: 2020).*
Office Action for Chinese Patent Application No. 201810153123.7 dated Jan. 6, 2020 with English translation, 14 pages.

* cited by examiner

RIDE-ON TOY VEHICLE CONFIGURED TO TILT AND DRIFT

CROSS-REFERENCE TO RELATED APPLICATIONS

This application claims priority to and the benefit of U.S. Provisional Patent Application No. 62/459,745 filed Feb. 16, 2017, and entitled "Ride-on Toy Vehicle Configured to Tilt and Drift," the disclosure of which is incorporated herein by reference in its entirety.

FIELD OF THE INVENTION

The present invention relates to a battery powered ride-on toy vehicle and, in particular, a battery powered ride-on toy vehicle configured to tilt or lean into turns and selectively drift while driving.

BACKGROUND

A toy ride-on vehicle is a reduced-scale vehicle that a child can ride and operate. For example, a toy ride-on vehicle may include a seat adapted to accommodate one or more children and steering and drive assemblies that are adapted to be operated by a child sitting in the seat. One type of drive assembly that is often used in toy ride-on vehicles includes a battery-powered motor assembly that is adapted to drive one or more of the vehicle's wheels. Typically, the vehicle will include an actuator, such as a foot pedal or other user input device that enables a child to select when power is delivered to the motor assembly. Steering assemblies typically allow a child to steer the vehicle through turns. However, typically, the various input devices included on a battery powered ride-on vehicle only allow a child to drive straight or turn at various speeds and, often, ride-on vehicles turn with a wide turning radius at relatively slow speeds. Consequently, new and interesting movement patterns and/or features are desired.

SUMMARY

Embodiments of the present invention relate to a battery powered ride-on toy vehicle. The ride-on vehicle includes a main body, a front wheel assembly, and a steering assembly. The front wheel assembly is angularly offset from the main body so that steering the vehicle into a turn with the steering assembly creates a camber angle in the wheels of the front wheel assembly and tilts the main body into a turn. The ride-on vehicle may also include a rear wheel assembly and a drive assembly configured to drive any wheels included in the front wheel assembly and the rear wheel assembly. In some embodiments, the front wheel assembly includes a beam that is angularly offset from the chassis of the main body and fixedly coupled to the chassis. Thus, tilting the beam causes the chassis and body to tilt. The toy vehicle can also drift through turns while tilting into the turn.

BRIEF DESCRIPTION OF THE DRAWINGS

Like reference numerals have been used to identify like elements throughout this disclosure.

DETAILED DESCRIPTION

Generally, the toy ride-on vehicle presented herein resembles a three-wheeled motorcycle. Like conventional toy ride-on vehicle, the toy ride-on vehicle presented herein can drive forwards, drive backwards, and turn right or left. However, when the toy ride-on vehicle presented herein turns, the vehicle may tilt or lean into the turn. This may decrease or tighten the turning radius of the toy ride-on vehicle and increase the entertainment value provided by the toy ride-on vehicle presented herein. As is described in detail below, the tilt is accomplished with a compact and simple solution, which allows the toy ride-on vehicle to provide this enhanced play or entertainment value without a drastic increase in costs as compared to conventional toy ride-on vehicles. In fact, as is described in detail below, the specific orientation of the front wheel assembly with respect to the main vehicle chassis causes the toy ride-on vehicle to tilt or lean into turns and, thus, the enhanced play value of tilting and leaning may be provided without extra parts or components as compared to a like toy vehicle with conventional turning capabilities/steering.

Moreover, in at least some embodiments, the toy ride-on vehicle presented herein can drift or slide through turns. As will be described below, drifting is enabled by locking the back wheel assembly of the toy ride-on vehicle and releasing the front wheel assembly of the toy ride-on vehicle (so that any wheels in the front wheel assembly can spin freely) during operation of the toy ride-on vehicle. The wheel assemblies may be shifted into the appropriate configurations (i.e., locked or released) by manipulating an associated motor via electrical signaling and, thus, this feature also provides increased play and/or entertainment value without a drastic increase in costs as compared to conventional toy ride-on vehicles.

Figure 1:
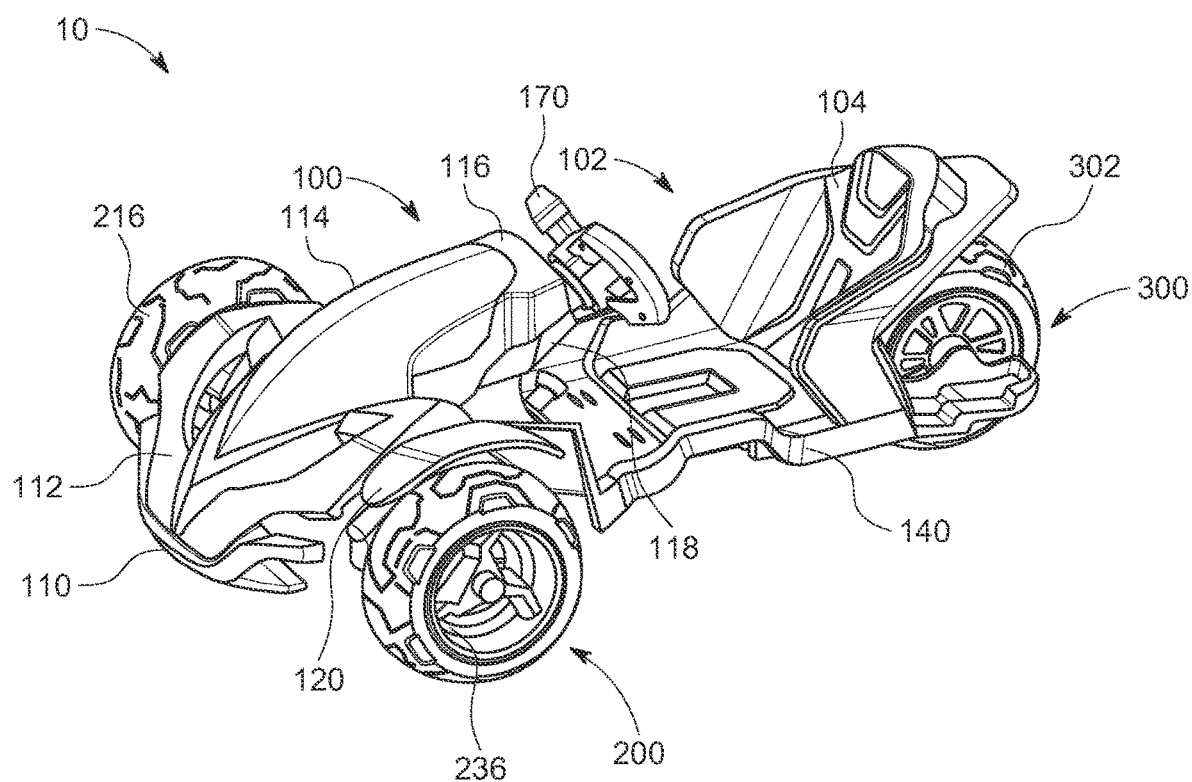
FIG. 1 illustrates an isometric view of an exemplary toy ride-on vehicle configured in accordance with the present invention.

In FIG. 1, a toy ride-on vehicle 10 is illustrated from an isometric view. The toy ride-on vehicle 10, referred to herein simply as a "vehicle," includes a body 100 that provides a riding space, or passenger compartment, 102 that is sized to accommodate at least one child, including a child driver. The body 100 typically is formed from molded plastic and may be integrally formed or formed from a plurality of parts that are secured together by screws, clips or other suitable fasteners. Alternatively, the body 100 may be made of some other suitable material including metal, wood, or composite structure having suitable strength to accommodate and support the weight of at least one child. In the depicted embodiment, the body 100 includes an underlying frame 140 that is mounted on a chassis 130 (see FIGS. 4 and 7). Often, the frame 140 and the chassis 130 are formed of metal and/or molded plastic.

The body 100 also includes or accommodates a seat assembly 104 within passenger compartment 102. The seat assembly 104 may be integral with or otherwise mounted on the body 100 and/or chassis 130 and may have any suitable configuration, including configurations in which the position of the seat assembly is adjustable within the passenger compartment 102, and configurations in which the seat assembly 104 includes two or more seats or two or more seating regions. Typically, vehicle 10 will be sized for use either by a child driver or by a child driver and a child passenger.

As shown, body 100 is shaped to generally resemble a reduced-scale three-wheel motorcycle. Consequently, the body 100 includes a front bumper 110, a central body portion formed from a lower part 118 and an upper part 116 (i.e., a housing for a steering column is formed from a lower part 118 and an upper part 116), and a cowling 112 that extends between the bumper 110 and a central body portion 116/118. The cowling 112 may be partially covered by a hood 114 and, in some embodiments, fenders 120 may extend from opposite lateral sides of the cowling 112, over front wheels included in the toy vehicle 100 (only one fender 120 is illustrated in FIG. 1). Each of these components may be mounted, fixedly or movable, as well as directly or indirectly, to the chassis 130 and/or frame 140. The frame 140 and chassis 130 are described in further detail in connection with FIGS. 2A, 4, and 7. However, it should be understood that a toy ride-on vehicle according to the present invention may be shaped to generally resemble any type of vehicle, provided the vehicle can provide the functionality described herein.

In fact, a toy ride-on vehicle according to the present invention need not include three wheels and, instead, may vary from two wheels to four, to six or more, provided that the wheels allow the vehicle to tilt and/or drift in the manner described below. Examples of suitable vehicles include, but are not limited to, reduced-scale or child-sized vehicles that are shaped to resemble corresponding full-sized, or adult-sized, vehicles, such as cars, trucks, construction vehicles, emergency vehicles, off-road vehicles, motorcycles, space vehicles, aircraft, watercraft and the like. When a toy ride-on vehicle is sized and shaped to generally resemble an adult-sized vehicle, its body and/or other components will often generally resemble corresponding components on the full-sized vehicle. However, it is also within the scope of the present invention that vehicle 10 may be shaped to resemble fantasy vehicles that do not have a corresponding adult-sized counterpart. Moreover, the wheels of the toy ride-on vehicle may be replaced by, or used in conjunction with, other movement inducing mechanisms such as one or more treads or tracks (i.e., in a tank or snowmobile-like toy vehicle). That being said, one example of a toy ride-on vehicle according to the present invention includes three wheels to provide stability while also providing efficient tilting and/or drifting in the manner described below.

Still referring to FIG. 1, vehicle 10 includes a front wheel assembly 200 and a rear wheel assembly 300. Each of wheel assembly 200 and wheel assembly 300 includes one or more wheels that are rotatably coupled to body 100 and/or chassis 130. For example, in the depicted embodiment, the front wheel assembly 200 includes a first wheel 216 and a second wheel 236 that are each rotatably coupled to the chassis 130. In fact, in the depicted embodiment, the first wheel 216 and a second wheel 236 may each be rotatable through two planes with respect to the chassis 130: a traditional or riding plane that allows the wheels to rotate along a riding surface and a second plane that is offset from the riding plane and allows wheels 216 and 236 to camber in or out, which tilts the entirety of vehicle 10. Consequently, the front wheel assembly 200 may be steered by a steering assembly 170 included in the vehicle 10 (i.e., at least partially in response to user inputs thereto (i.e., via a steering wheel 172, as shown in FIG. 2B)), but may also tilt or lean the vehicle 10 into turns as the vehicle 10 is steered with the steering assembly 170. This tilting or leaning is described in further detail below.

By comparison, in the depicted embodiment, rear wheel assembly 300 is fixedly coupled to the chassis 130 and/or body 100 so that a single wheel 302 included in the rear wheel assembly can tilt or cant with the chassis 130 and/or body 100, as is described in further detail below. However, in other embodiments, any wheel (i.e., from assembly 200 or 300) may be steerable. For example, it is within the scope of the invention that wheel 216, wheel 236, and wheel 302 are all steerable by steering assembly 170.

Collectively, the front wheel assembly 200 and rear wheel assembly 300 provide a plurality of wheels (i.e., wheel 216, wheel 236, and wheel 302) that includes at least one driven wheel, insofar as the term "driven wheel" refers to a wheel that is rotated directly in response to a rotational input from the vehicle's motor assembly. The rotational input may be conveyed to a driven wheel directly, by the output of the motor assembly, or through a linkage, such as a gearbox, belt, chain, gear assembly, axle, shaft or the like. In the depicted embodiment, wheel 216, wheel 236, and wheel 302 are each driven wheels. Consequently, wheel 216, wheel 236, and wheel 302 are each adapted to be rotationally driven by a motor assembly controlled by the vehicle's drive system, as is described in further detail below.

Figure 2A:
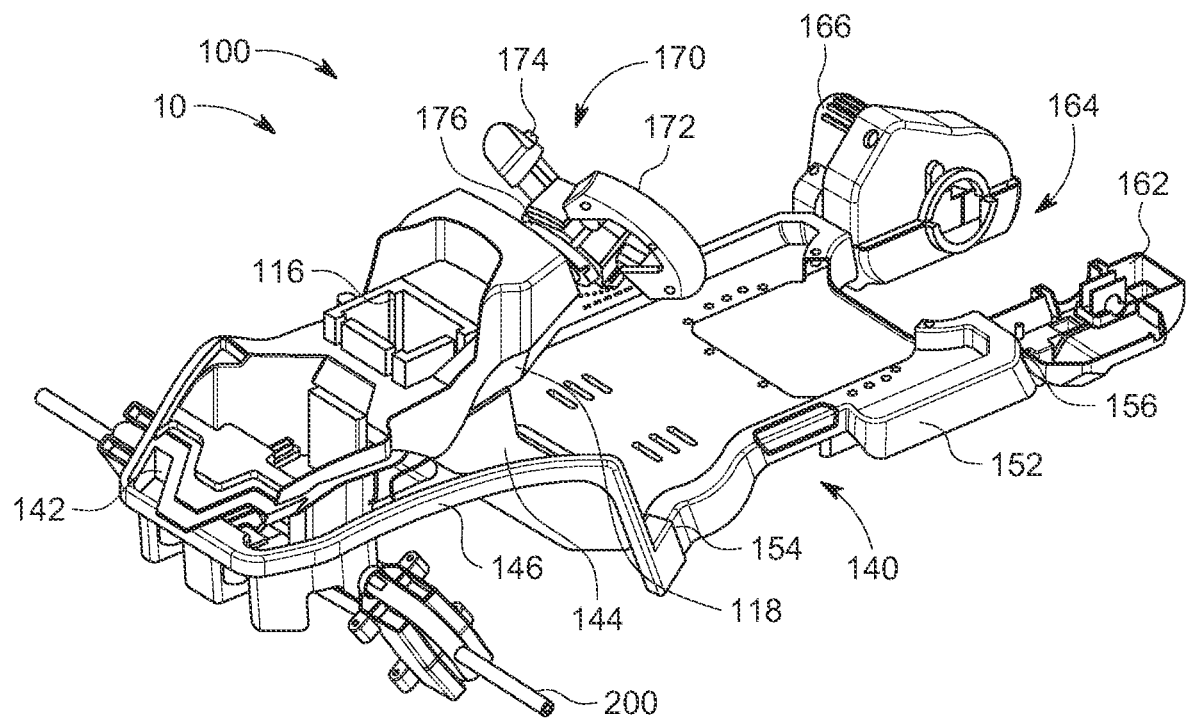
FIG. 2A illustrates an isometric view of a frame included in the toy ride-on vehicle of FIG. 1. Various portions of a main body and wheel assemblies included in the toy ride-on vehicle of FIG. 1 are removed for clarity.
Figure 2B:
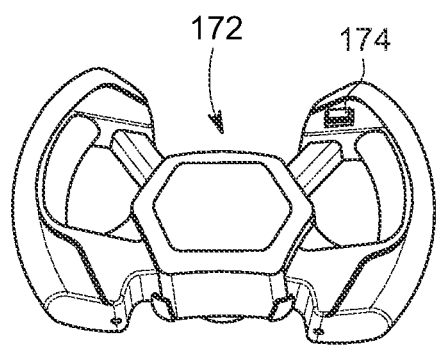
FIG. 2B illustrates a front perspective view of a steering wheel included in the toy ride-on vehicle of FIG. 1.

Still referring to FIG. 1, but now with reference to FIGS. 2A and 2B as well, the vehicle 10 includes a steering assembly 170 with a steering column 176 (shown in its entirety in FIG. 4) and a steering mechanism 172. The steering assembly 170 enables a child sitting on seat 104 to steer the vehicle's steerable front wheel assembly 200 via user-applied steering inputs to steering mechanism 172 (which is positioned on vehicle 10 for operation by a child sitting on seat 104). As can be seen in FIG. 2B, steering mechanism 172 takes the form of a steering wheel that includes a switch 174. The switch 174 may be selectively actuatable and when actuated may cause the vehicle 10 to initiate a drifting motion, as is described in further detail below. However, it should be understood that other suitable structures, such as handlebars, steering levers, joysticks, and/or a dashboard switch may be used in other embodiments. Steering could also be accomplished via shifting of the driver's (or the driver's and passenger's) weight to steer the vehicle 10. Steering column 176 includes any suitable mechanical linkage that conveys a child's steering inputs from the steering mechanism 172 to the steerable front wheel assembly 200, thereby steering the vehicle 10.

In FIG. 2A, the vehicle 10 is shown with various portions of the body 100, front wheel assembly 200 and rear wheel assembly 300 removed. With these portions removed, the frame 140 can be seen. In the illustrated embodiment, the frame 140 includes a front section 142, a midsection or middle section 152 and a rear section 162. The midsection 152 extends between the front section 142 and the rear section 162. In some embodiments, these sections may be formed integrally, but in the illustrated embodiment, the sections are formed separately and midsection 152 is coupled to the front section 142 at joint 154 and coupled to the rear section 162 at joint 156.

Regardless of whether the sections of the frame 140 are formed integrally or coupled together, in some embodiments, such as the illustrated embodiment, the frame 140 is substantially rigid so that, if tilted, the entire frame 140 tilts together. The chassis 130 may also be fixedly or rigidly coupled to the frame 140 to ensure that the chassis 130 and frame 140 (or the entire body 100) tilt in unison. By comparison, in alternative embodiments, the mid-section 152 may be fixedly coupled to the rear section 162, but rotatably or otherwise movably coupled to the front section 142. In these embodiments, the midsection 152 and rear section 162 (including the seat 104 and the rear wheel assembly 300) may be configured to tilt (i.e., rotate about a longitudinal axis extending through a front and back of the vehicle 10) with respect to the front section 142 as the vehicle turns. This tilting may be utilized in place of or in addition to the camber rotation of the front wheel assembly 200 that causes the vehicle 10 to essentially lean in to turns, as is described below. For example, the midsection 152 and rear section 162 could be mechanically coupled to the steering assembly 170 and configured to move therewith and/or actuators could be programmed to rotate the midsection 152 and rear section 162 in response to the angular orientation of the steering assembly 170. Alternatively, the tilting of the midsection 152 and rear section 162 with respect to the front section 142 could also be accomplished via shifting of the driver's (or the driver's and passenger's) weight.

Regardless of whether the frame 140 is rigid or rotatable, the front section 142 and the midsection 152 are collectively configured to support a majority of body 100 (at least in the illustrated embodiment) and the front wheel assembly 200. More specifically, the front wheel assembly 200 is coupled to a lower side 146 of the front section 142, but at an angle with respect to the frame 140 (as is shown clearly in the side view of FIG. 4). Meanwhile, the central body section 116/118 extends upwards from a top side 144 of the front section 142 of the frame 140. Consequently, the central body section 116/118 may provide a conduit that allows the steering assembly 170 to extend substantially between the passenger compartment 102 and the front wheel assembly 200. In some embodiments, the central body section 116/118 may be movably coupled to the frame 140 and/or chassis 130 to encourage a child to lean into turns; however, in the depicted embodiment, the central body section 116/118 is fixedly coupled to the frame 140 and chassis 130 and tilts with these components. Moreover, in the depicted embodiment, the front wheel assembly 200 is oriented nearly perpendicularly to the steering column 176 of the steering assembly 170 and, thus, may appear to be oriented generally perpendicular to the body section 116/118. The details of the orientation of the front wheel assembly 200 is discussed in further detail below.

Meanwhile, and also regardless of whether the frame 140 is rigid or rotatable, the midsection 152 and the rear section 162 are configured to support the seat 104 and the rear wheel assembly 300. For example, the rear section 162 of the frame 140 may define a wheel well 164 and include a motor housing 166 that is disposed beside and in lateral alignment with the wheel well 164. In the illustrated embodiment, the wheel well 164 secures the rear wheel assembly 300 (see FIG. 1) to the frame 140 so that the wheel 302 (see FIG. 1) is only free to rotate about a central axle (not shown) that is secured to the rear section 162 on either side of the wheel well 164. In other words, the rear wheel 302 may only rotate within the frame 140 and may not otherwise move with respect to the frame 140 (and, instead, tilts or cants with the frame 140).

Figure 3:
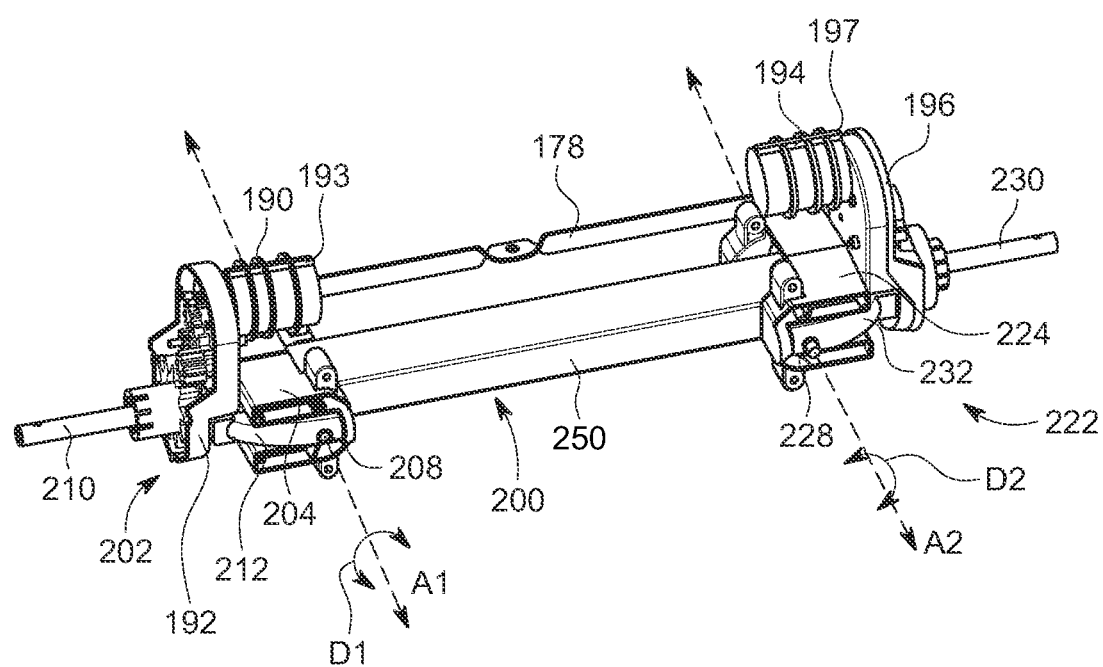
FIG. 3 illustrates a top perspective view of a portion of a front wheel assembly included in the toy ride-on vehicle of FIG. 1. Various parts or components of the front wheel assembly are removed for clarity.

Now referring to FIG. 3, the front wheel assembly 200 is shown from a top perspective view and is only shown in this orientation to illustrate the parts and components included in the front wheel assembly 200. The orientation depicted in FIG. 3 is not representative of the orientation of the front wheel assembly 200 when the front wheel assembly 200 is disposed in the vehicle 10. Instead, the orientation or position of the front wheel assembly 200 was briefly described in connection with FIG. 2A and is described in further detail below in connection with FIGS. 4-9. Moreover, in FIG. 3, the front wheel assembly 200 is shown with wheels 216 and 236 removed to clearly illustrate interplay between components of the front wheel assembly 200 and components of the steering assembly 170 and/or a motor assembly 186 (see FIG. 10) that are supported by the front wheel assembly 200.

More specifically, the front wheel assembly 200 includes linkages 202 and 222 that couple wheels 216 and 236 (see FIG. 1), respectively, to the steering assembly 170. Linkages 202 and 222 are each pivotally coupled to opposite ends of an elongate member 250, which may also be referred to as beam 250, and are mechanically linked (i.e., coupled) to a steering linkage 178. The beam 250 may be formed from metal (i.e., steel or some other metal alloy) or any material with structural integrity and may be fixedly coupled to the chassis 130. Consequently, if the beam 250 tilts (i.e., angles, slopes, slants, etc.) towards either linkage 202 or linkage 222, the entire chassis 130 may tilt towards that linkage, as will be explained in further detail below.

Generally, the steering linkage 178 is configured to cause linkages 202 and 222 to pivot (i.e., rotate) on or around the ends of the beam 250 in response to user inputs at the steering mechanism 172 (see FIGS. 2A and 2B). To effectuate this movement, linkage 202 includes a pivot assembly 204 that is rotatably coupled (i.e., pinned) to the beam 250 with a bolt 208 so that the pivot assembly 204 can only rotate in the directions indicated by arrow D1, around an axis A1 that is collinear with the bolt 208. An axle 210 including a forked linkage or yoke 212 is fixedly coupled to (i.e., around) the pivot assembly 204 and thus, can only move with the pivot assembly 204 in the directions indicated by arrow D1, around axis A1. In other words, in the depicted embodiment, the linkage 202 has only one degree of freedom with respect to beam 250. Moreover, rotation in this rotational degree of freedom (indicated by arrow D1, around axis A1) may be limited by the shape and size of the pivot assembly 204 and the beam 250 (thereby controlling the turning radius of wheel 216 (see FIG. 1)).

Similarly, linkage 222 includes a pivot assembly 224 that is rotatably coupled (i.e., pinned) to the beam 250 with a bolt 228 so that the pivot assembly 224 can only rotate in the directions indicated by arrow D2, around an axis A2 that is collinear with the bolt 228. An axle 230 including a forked linkage or yoke 232 is fixedly coupled to (i.e., around) the pivot assembly 224 and thus, can only move with the pivot assembly 224 in the directions indicated by arrow D2, around axis A2. In other words, in the depicted embodiment, the linkage 224 has only one degree of freedom with respect to beam 250. Moreover, rotation in this rotational degree of freedom (indicated by arrow D2, around an axis A2) may be limited by the shape and size of the pivot assembly 224 and the beam 250 (thereby controlling the turning radius of wheel 236 (see FIG. 1)).

Figure 7:
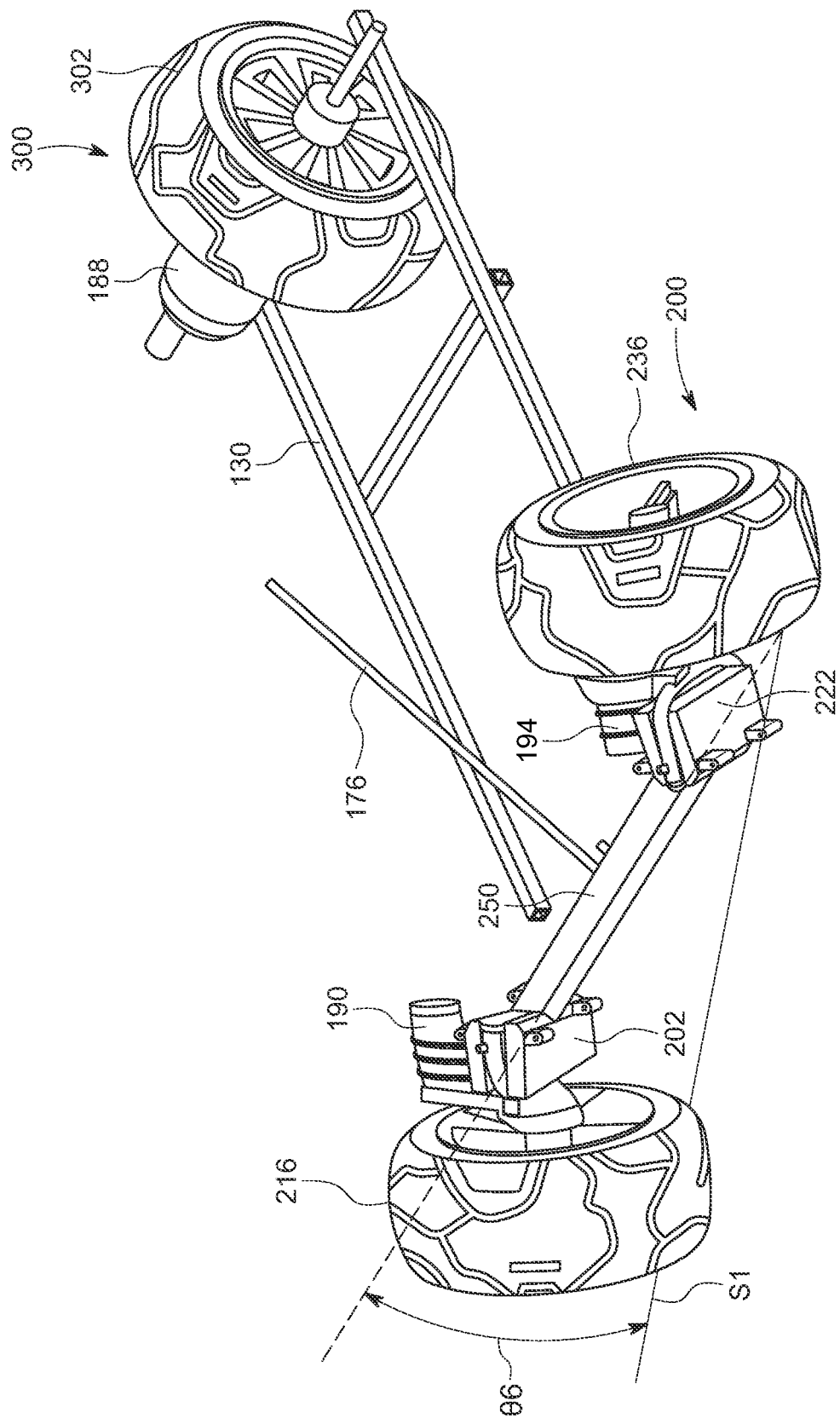
FIG. 7 illustrates a front perspective view of the wheel assemblies and the chassis of the toy ride-on vehicle of FIG. 1 while making a left turn. Various parts or components of the toy ride-on vehicle are removed for clarity.

Still referring to FIG. 3, but now with reference to FIG. 7 as well, front wheel assembly 200 and rear wheel assembly 300 each support components of the motor assembly 186. In particular, a motor and motor linkage is allocated to each of wheel 216 (see FIGS. 2A and 7), wheel 236 (see FIGS. 2A and 7), and wheel 302 (see FIG. 7). More specifically, in the illustrated embodiment, motor 190 is coupled to a gear box 192 (shown with an exterior cover removed to illustrate example gears) that is mounted on axle 210 and configured to impart driving rotational motion from motor 190 to wheel 216. Similarly, motor 194 is coupled to a gear box 196 (gearbox 196 is shown with an exterior cover, but may be identical to gearbox 192) that is mounted on axle 230 and configured to impart driving rotational motion from motor 194 to wheel 236. In FIG. 3, motor 190 is depicted within a motor cover 193 and motor 194 is depicted within a motor cover 197. Covers 193 and 197 may be included to ensure that a child cannot access motors 190 and 194. In FIG. 7, the motor 188 allocated to the rear wheel 302 is shown laterally aligned with the rear wheel 302 and the motor 188 is configured to impart driving rotational motion from directly to wheel 302. However, in other embodiments, rear wheel assembly 300 may support a linkage of any kind, such as a gearbox similar to gearboxes 192 and 196 to impart driving rotational motion from motor 188 to wheel 302.

Figure 4:
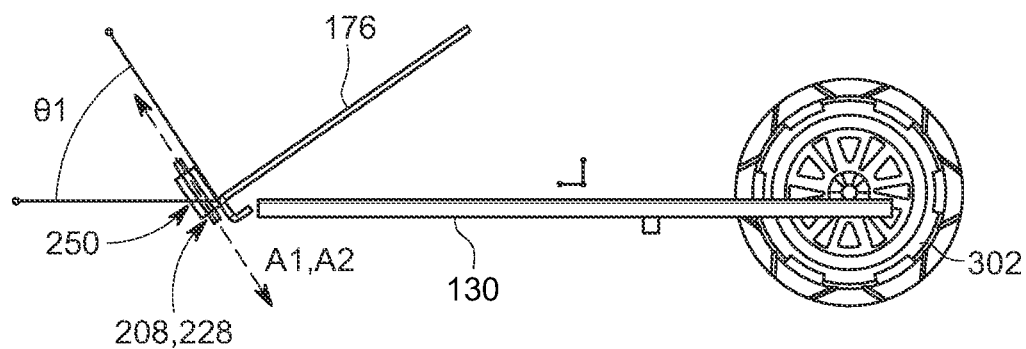
FIG. 4 illustrates a side, sectional view of a chassis and a portion of the front wheel assembly of the toy ride-on vehicle of FIG. 1. Various parts or components of the toy ride-on vehicle are removed for clarity.

Now turning to FIG. 4, a side sectional view of selected components of the vehicle 10 depicts the orientation of the front wheel assembly 200 with respect to the chassis 130 and the steering column 176 of the steering assembly 170. As mentioned, the front wheel assembly 200 is angled with respect to the chassis 130. This is illustrated best by the angle of the beam 250 with respect to the remainder of the chassis 130, as is shown in FIG. 4. Due to the orientation of beam 250, the bolts 208, 228 that define the rotational axes A1 and A2 of linkages 202 and 222 are angularly offset from a horizontal plane aligned with a top of the chassis 130. In particular, axes A1 and A2 are offset from the horizontal plane aligned with a top of the chassis 130 by an angle θ of approximately 57.5 degrees (and, thus, 32.5 degrees offset from a vertical axis). However, in other embodiments, the angle θ may be any angle within a range of approximately 52-62 degrees, 45-70, or even 30-75 degrees. It should be noted that in typical steering mechanisms, angle θ is 90 degrees (and, thus, 0 degrees offset from a vertical axis). In the depicted position, the beam 250 is also substantially perpendicular to the steering column 176.

For illustrative purposes, FIG. 4 shows the beam 250 as disconnected from the remainder of chassis 130; however, it is to be understood that in at least the illustrated embodiment, the beam 250 is coupled to and comprises a part of the chassis 130. Thus, as mentioned, if the beam 250 tilts or dips towards a particular wheel linkage 202, 222 (and, thus, towards a particular front wheel 216, 236), the chassis 130 may also dip towards that linkage. Since rear wheel 302 is fixedly coupled to the chassis 130, this tilting or dipping may also cause the rear wheel 302 to tilt or cant, as is explained in further detail below.

Figure 5:
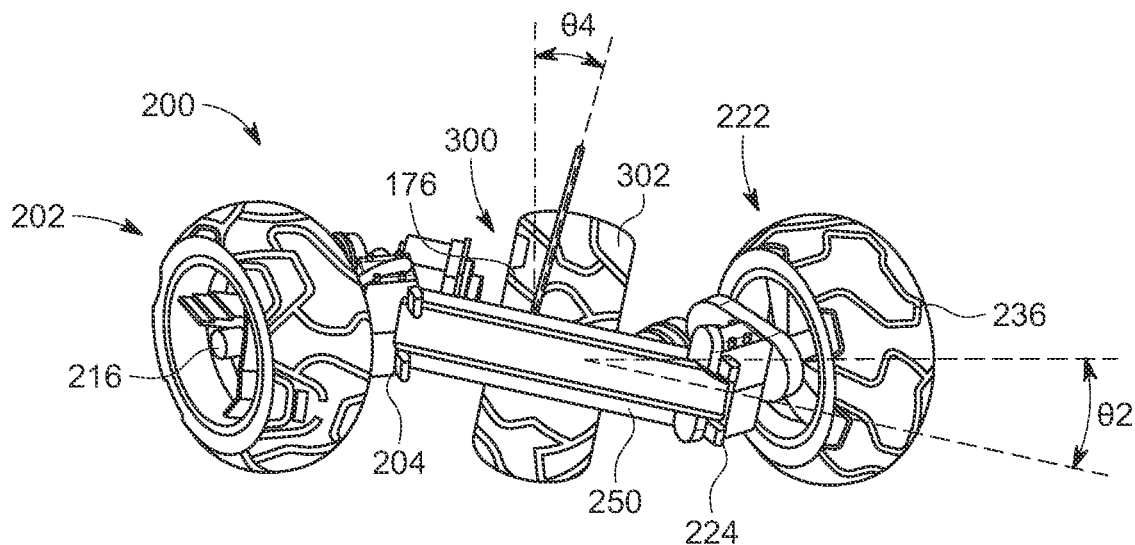
FIGS. 5 and 6 illustrate front views of the wheel assemblies included in the toy ride-on vehicle of FIG. 1 while making left and right turns, respectively. Various parts or components of the toy ride-on vehicle are removed for clarity.
Figure 6:
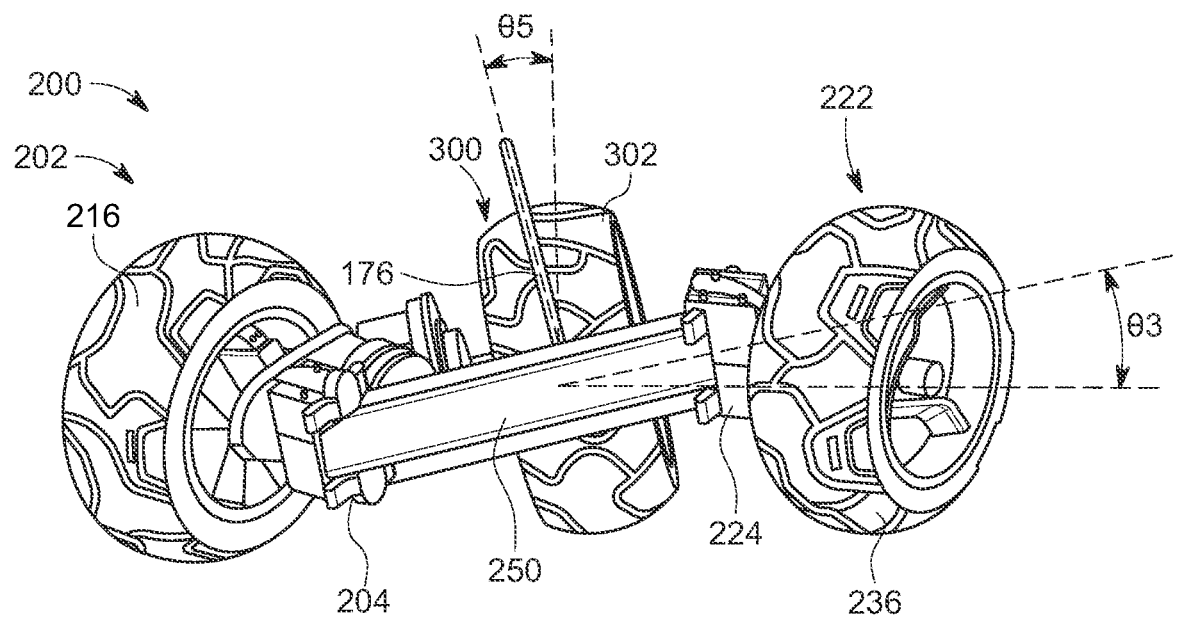

Now turning to FIGS. 5 and 6, the front wheel assembly 200, chassis 130, and rear wheel assembly 300 are shown from a front view while the vehicle 10 is turning left and right, respectively. The steering column 176 is also shown in these Figures. Generally, when the steering column 176 is rotated about its longitudinal axis (i.e., due to input at the steering mechanism 172), the steering linkage 178 (see FIG. 3) will rotate linkages 202 and 222 about their respective axes A1 and A2. Rotation of the linkages 202 and 222 about axes A1 and A2 that are running through an angularly offset beam 250 causes the wheels 216 and 236 to cant or tilt with respect to a riding surface and/or a horizontal plane. Notably, since steering linkage 178 mechanically links linkage 202 to linkage 22 (or vice versa), the linkages 202 and 222 (as well as wheel 216 and 236) move in mirrored synchronization (i.e., equal but opposite movements).

More specifically, as the vehicle 10 makes a turn, an inner wheel of the vehicle (i.e., for right turns, the right wheel) cambers inwards, also called negative camber, while the outer wheel (i.e., for right turns, the left wheel) cambers outwards, also called positive camber. That is, as wheels 216 and 236 turn, the wheels move or rotate through two planes. The camber angles created by this movement lowers the center (i.e., the axle) of the inner wheel while raising the center (i.e., the axle) of the outer wheel, thereby tilting or angling the beam 250 so that the chassis 130 tilts or leans into a turn.

As a more specific example, in FIG. 5, the vehicle 10 is illustrated while turning left (since the vehicle 10 is shown from a front view, the vehicle 10 appears to be turning towards the right side of the page). To turn left, wheel 216 (the front right wheel) is rotated forwards about axis A1 (see FIGS. 3 and 4) and wheel 236 (the front left wheel) is rotated rearwards about axis A2 (see FIGS. 3 and 4). Due to the offset/angular orientation of the beam 250 described with respect to FIG. 4 above (through which the axes A1 and A2 extend), forward rotation of wheel 216 about axis A1 cants wheel 216 outwards. That is, the top of wheel 216 moves away from the body 100, creating a positive camber. By comparison, due to the offset/angular orientation of the beam 250, rearward rotation of wheel 236 about axes A2 cants wheel 236 inwards. That is, the top of wheel 236 moves towards the body 100, creating a negative camber.

By comparison, in FIG. 6, the vehicle 10 is illustrated while turning right (since the vehicle 10 is shown from a front view, the vehicle 10 appears to be turning towards the left side of the page). To turn right, wheel 216 (the front right wheel) is rotated rearwards about axis A1 (see FIGS. 3 and 4) and wheel 236 (the front left wheel) is rotated forwards about axis A2 (see FIGS. 3 and 4). Due to the offset/angular orientation of the beam 250 (again, through which the axes A1 and A2 extend), rearward rotation of wheel 216 about axis A1 cants wheel 216 inwards. That is, the top of wheel 216 moves towards the body 100, creating a negative camber. In contrast, due to the offset/angular orientation of the beam 250, forward rotation of wheel 236 about axes A2 cants wheel 216 inwards. That is, the top of wheel 236 moves away the body 100, creating a positive camber.

Now referring to both of FIGS. 5 and 6, when wheel 216 has a positive camber angle and wheel 236 has a negative camber angle (i.e., for a left turn, as shown in FIG. 5), the center of wheel 236 is disposed below the center of wheel 216, causing the beam 250 to angle, at angle θ2, towards the turn. By comparison, when wheel 216 has a negative camber angle and wheel 236 has a positive camber angle (i.e., for a right turn, as shown in FIG. 6), the center of wheel 216 is disposed below the center of wheel 236, causing the beam 250 to angle, at angle θ3, towards the turn.

Angles θ2 and θ3 may each be proportional to the angular rotation of the steering column 176 (i.e., proportional to the amount a child is turning the steering mechanism 172). For example, angles θ2 and θ3 may be directly proportional to the angular rotation of the steering column 176 over a range of approximately 0-30 degrees with respect to a horizontal axis aligned with a center of the beam 250 (where 0 degrees represents a rest or non-tilted position of the beam 250). Additionally, θ2 and θ3 may each be the same natural number for turns of equivalent magnitude, but may simply be inverse measurements of each other when the angles are measured from the same side of the vehicle 10. For example, turning the steering mechanism 172 ninety degrees to the left may create an angle θ2 of approximately 10 degrees below a horizontal central axis of the beam 250 (i.e., an angle θ2 of −10 degrees) and turning the steering mechanism 172 ninety degrees to the right may create an angle θ3 of approximately 10 degrees above a horizontal central axis of the beam 250 (i.e., an angle θ3 of +10 degrees) when angle θ2 and θ3 are each measured from the same side of the vehicle 10, as is shown in FIGS. 5 and 6.

Still referring to both FIG. 5 and FIG. 6, but now with reference to FIG. 7 as well, since the beam 250 is fixedly coupled to the chassis 130, tilting or angling of the beam 250 (to angles θ2 or θ3) tilts or dips the chassis 130 towards the front, inner wheel of the vehicle during a turn. Since, as mentioned, the rear wheel assembly 300 is fixedly coupled to the chassis 130 (while only allowing rotational driving movement of the rear wheel 302), tilting of the chassis 130 may tilt or camber the rear wheel 302. For example, when the vehicle 10 turns left (as shown in FIGS. 5 and 7), the rear wheel 302 may tilt to a position that is offset from a vertical axis at an angle θ4 that is proportional to the tilt angle θ2 of the beam 250. Similarly, when the vehicle 10 turns right (as shown in FIG. 6), the rear wheel 302 may tilt to a position that is offset from a vertical axis at an angle θ5 that is proportional to the tilt angle θ3 of the beam 250. Similar to angles θ2 and θ3, angles θ4 and θ5 may each be the same natural number for turns of equivalent magnitude, but may simply be inverse measurements of each other when the angles are measured with respect to a single vertical axis.

Moreover, generally, due to the size, shape, weight and/or natural resistance of the vehicle 10 (and/or a child seated therein), the tilting or dipping of the chassis 130 may dampen or decrease from the front assembly 200 to the rear assembly 300 and, thus, angles θ4 and θ5 may proportionally smaller than angles θ2 and θ3, respectively. For example, if angle θ2 is approximately 18 degrees, angle θ4 may be approximately 15 degrees. However, in different embodiments, the relationship between the tilt angles θ4 and θ5 of the rear wheel assembly and the tilt angles θ2 and θ3 of the front wheel assembly 200 may be defined by any desired formula, ratio, etc. Alternatively, the tilt angles θ4 and θ5 of the rear wheel assembly may be equivalent to the tilt angles θ2 and θ3 of the front wheel assembly 200.

In FIG. 7, the tilt of the vehicle 10 is shown with respect to a riding surface S1. Due to the orientation of the front wheel assembly 200 (which is turning left) and the perspective of the illustration, the angular measurement depicted in FIG. 7 may not be exact. Instead, the angular measurement is provided for illustrative purposes only. More specifically, FIG. 7 illustrates an angle θ6 that depicts the angle of the beam 250 with respect to a riding surface S1 during a left turn and shows how the vehicle 10 may tilt or lean into a turn. Although FIG. 7 may not correctly demonstrate the dimensions of angle θ6, based on geometric principles, angle θ6 is equivalent to θ2 (at least because the riding surface S1 is substantially parallel to a rest position of the beam 250). Thus, the angles discussed above in connection with FIGS. 5 and 6 may also be understood to define an angle of the beam 250 (and/or the chassis 130) with respect to a riding surface S1.

Figure 8:
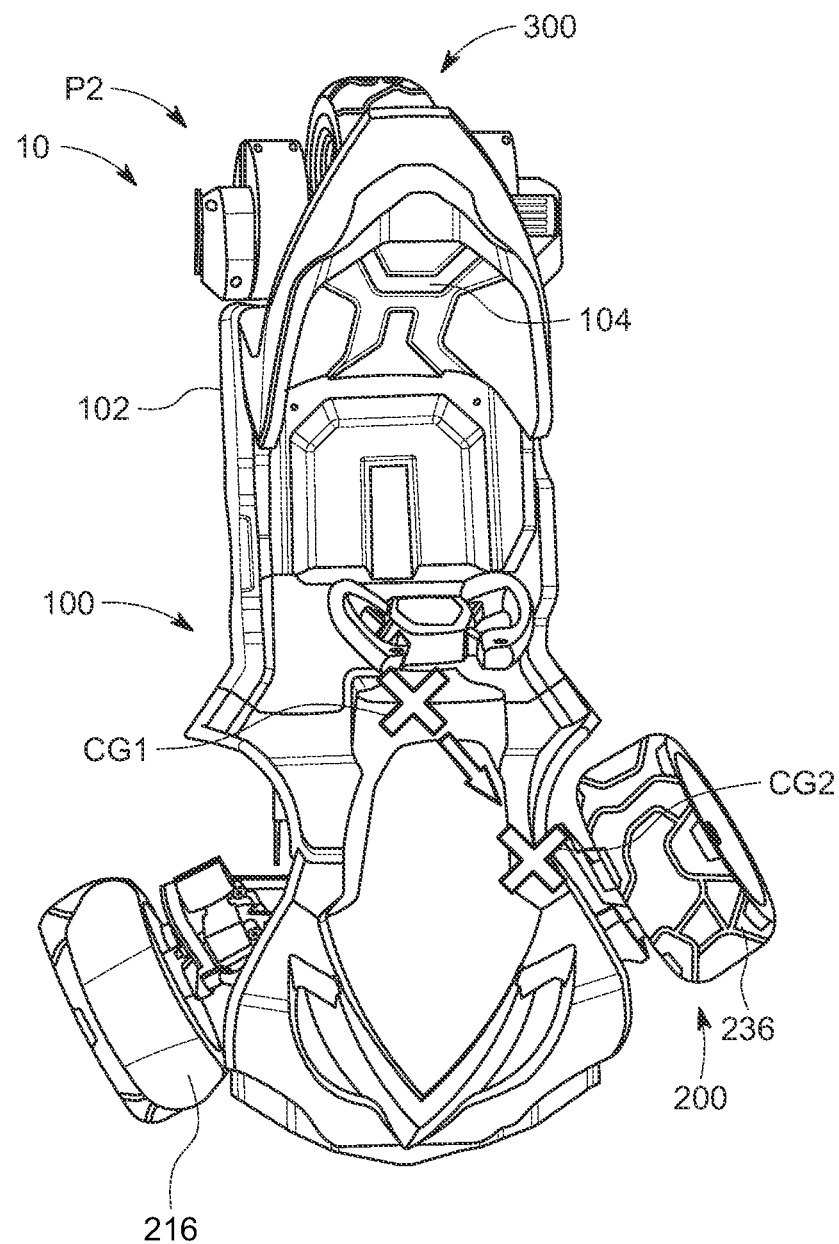
FIGS. 8 and 9 illustrate tops views of the toy ride-on vehicle of FIG. 1 while making left and right turns, respectively.
Figure 9:
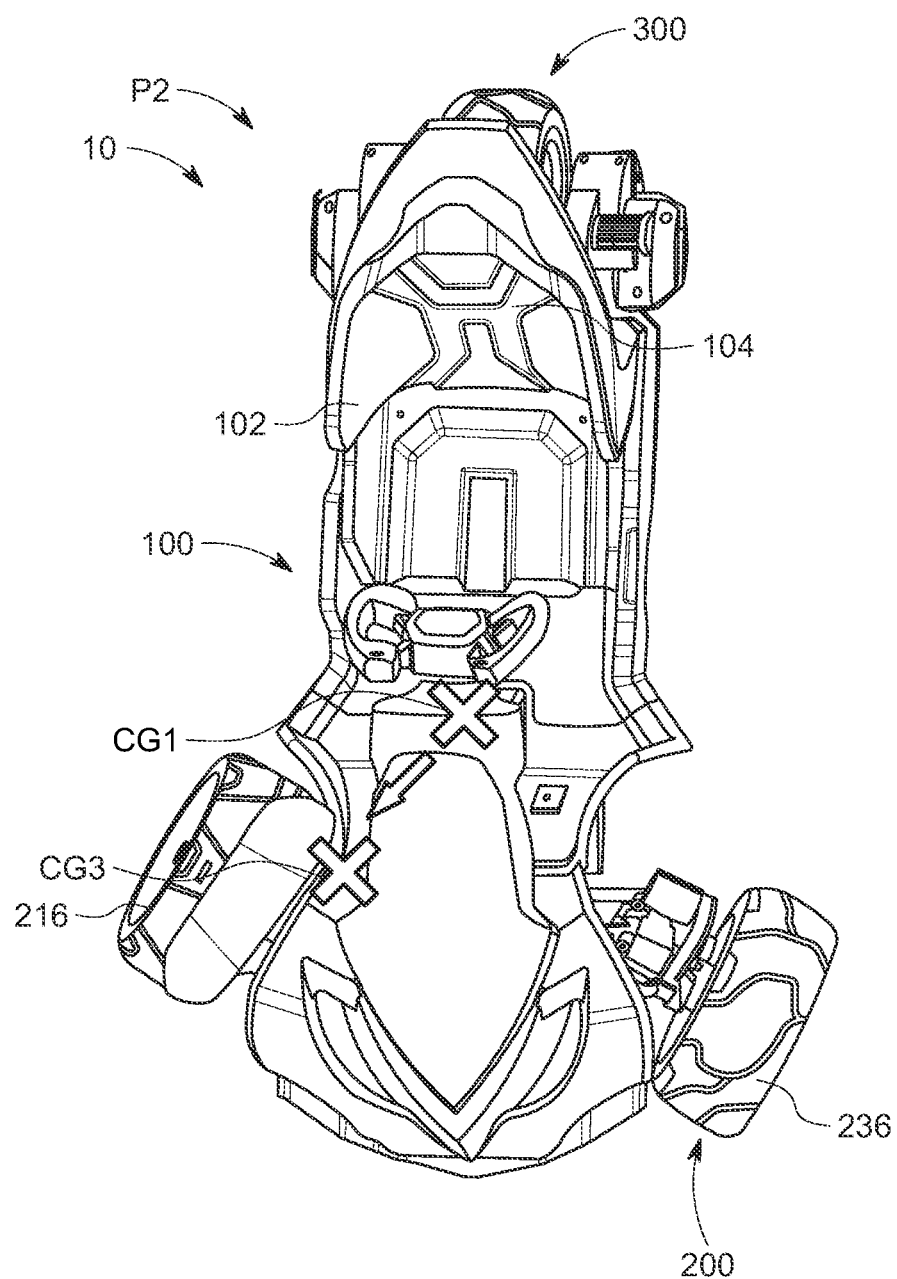

Now turning to FIGS. 8 and 9, as the vehicle 10 tilts or leans into turns, the center of gravity of the vehicle 10 may move towards the front, inner wheel. In FIGS. 8 and 9, the center of gravity is shown to illustrate this movement, but the marked locations are only shown for illustrative purposes and may not be the locations of the actual center of gravity, which may shift dynamically and vary depending on the weight, height, and position of a child riding in the vehicle 10 (as well as different characteristics of the vehicle and/or attachments/accessories included on or in the vehicle 10). That being said, when the vehicle 10 is driving straight (forwards or backwards), the center of gravity may be disposed substantially proximate to (or aligned with) the steering mechanism 170, as illustrated by reference label CG1. Then, as the vehicle 10 turns left, the center of gravity may shift towards wheel 236 (the front, left wheel), as illustrated by reference label CG2 (FIG. 8). Alternatively, if the vehicle 10 turns right, the center of gravity may shift towards wheel 216 (the front, right wheel), as illustrated by reference label CG3. Notably, if the vehicle moves from a left turn to a right turn, or vice versa, the center of gravity may move from a first turning position (CG2 or CG3) to CG1 before moving to the other turning position (CG2 or CG3).

Figure 10:
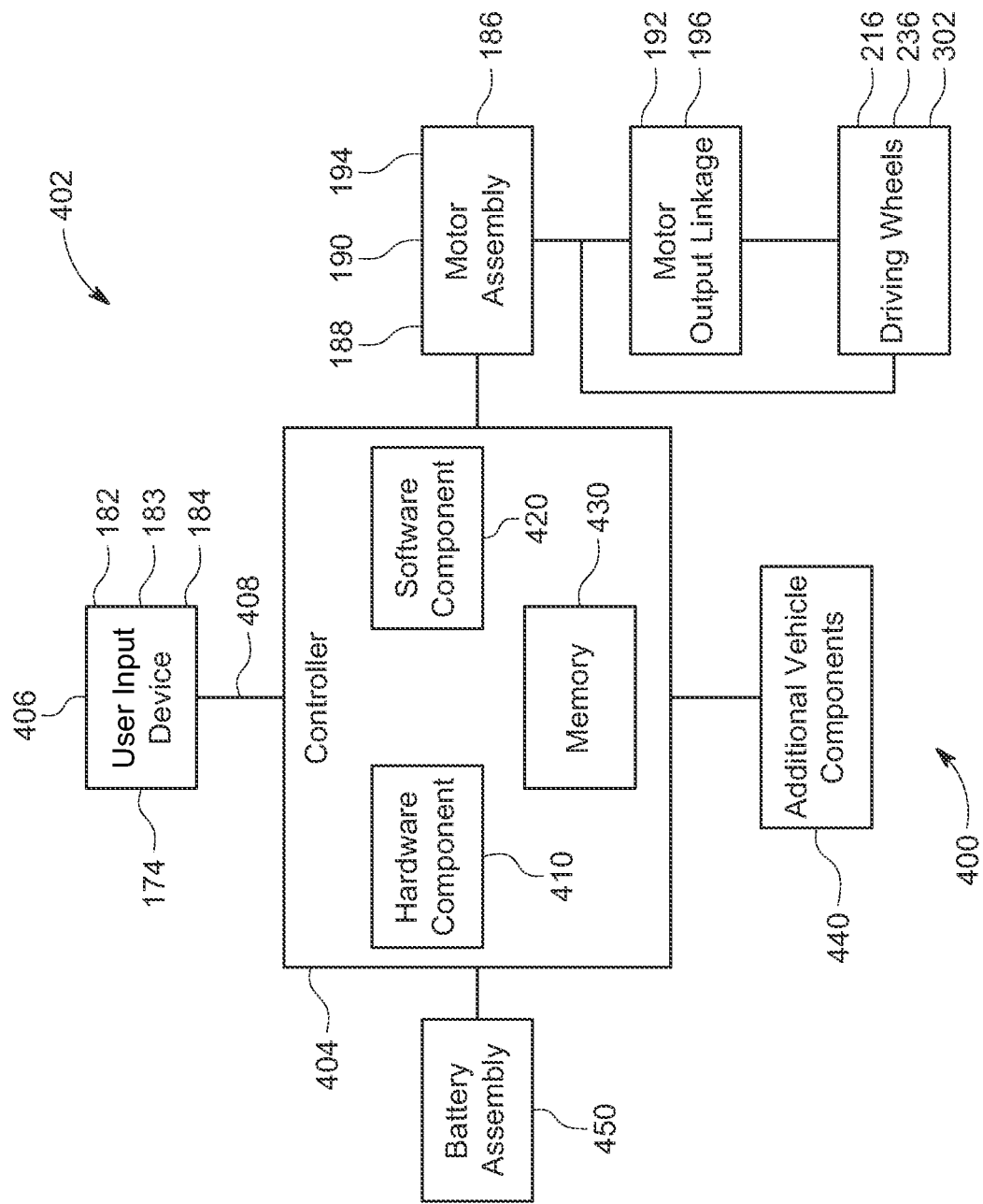
FIG. 10 is a block diagram of the toy ride-on vehicle of FIG. 1.

FIG. 10 is block diagram 400 that schematically illustrates, among other elements, an electronic drive system 402 and the motor assembly 186 of vehicle 10. The electronic drive system 402 is generally configured to supply electrical signals to motor assembly 186 to drive any driven wheels included in the toy vehicle 10 (i.e., wheels 216, 236, and 302). As has been described herein, the motor assembly 186 includes motors 188, 190, and 194 that transmit rotational forces to the driven wheels 216, 236, and 302, either directly or via a motor output linkage, such as gearbox 192 or 196. More specifically, in the illustrated embodiment, motor 188 transmits rotational forces directly to wheel 302, motor 190 transmits rotational forces to wheel 216 via gearbox 192, and motor 194 transmits rotational forces to wheel 236 via gearbox 196.

In order to send the electrical signals to the motor assembly 186, the electronic system 402 includes a controller 404 that may be implemented via any suitable electronic (electrical) device or combination of devices. For example, controller 404 may be implemented entirely with hardware 410 or may include software components 420 and hardware components 410. More specifically, controller 404 may be entirely implemented with analog components, or it may additionally or alternatively include a microprocessor or other programmable device in which software is stored. Hardware component 410 includes one or more devices adapted to at least partially perform the regulating function of controller 404. When the controller includes a software component 420, it may also include a memory 430, such as to store software, look up values or tables, threshold values, measured values, etc. Memory 430 may include volatile and/or non-volatile portions. It should be understood that it is within the scope of the invention that controller 404 may perform functions other than those discussed herein with respect to regulating the speed at which the vehicle is driven.

As a more specific explanation, the electronic drive system 402 may be or include the electronic drive systems described in U.S. patent application Ser. No. 15/093,115, entitled "Electronic Drive System for a Ride-On toy Vehicle," which was filed on Apr. 7, 2016, and published on Oct. 13, 2014 as U.S. Patent Application Publication No. US 2016/0296848 A1, and is hereby incorporated by reference in its entirety. Thus, although the electronic drive system 402 is only generally illustrated as having a controller 404 with a hardware component 410, a software component 420, and memory 430, the electronic drive system 402 is the operational control entity for the toy vehicle 10 and may include any number of components or logic to efficiently and effectively operate the toy vehicle 10.

For example, the electronic drive may include a programming interface, a wireless communication module, a battery interface, at least one processor (i.e., central processing unit (CPU)), one or more status lights, a battery monitoring circuit, a field-effect transistor (FET) driver, an occupant sensor, a stability sensor, an electronic safety brake, a dual H-bridge, and an indirect wheel speed sensor. Consequently, the electronic drive system 402 may perform any operations described in U.S. Patent Application Publication No. US 2016/0296848 A1. For example, electronic drive system 402 may provide stability and traction control (including over uneven surfaces), dynamic power delivery to the motors in motor assembly 186, wheel speed detection, speed monitoring and subsequent remediation (i.e., maintaining a wheel speed on an incline or ensuring that motors of motor assembly 186 operate within a specific range), ambient temperature measuring, battery monitoring, occupant sensing, and/or data logging operations.

Figure 11:
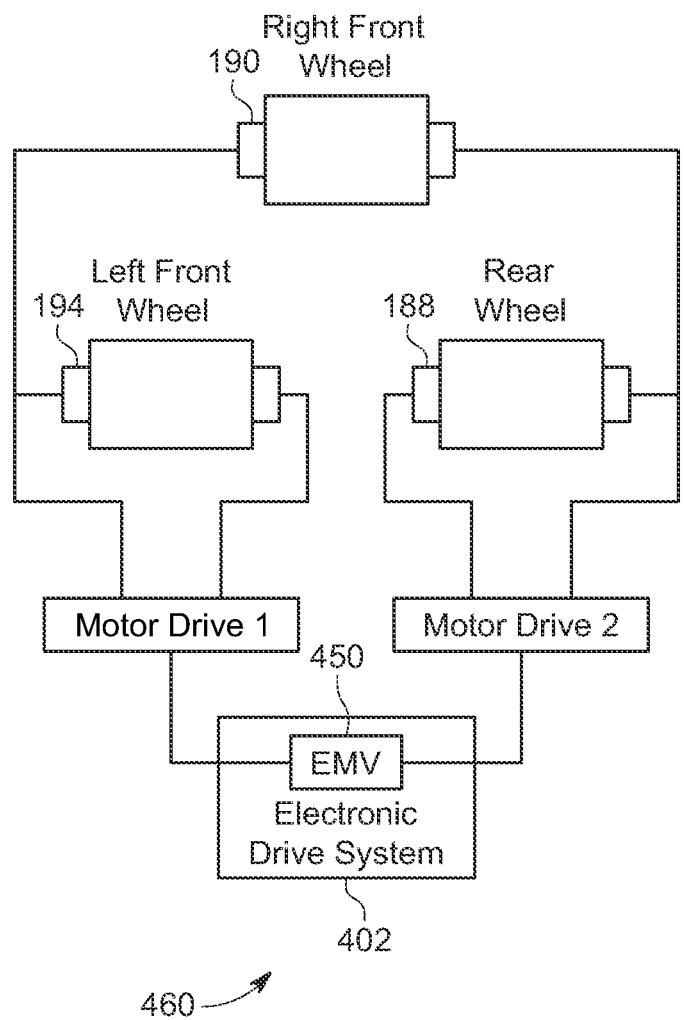
FIG. 11 is a schematic diagram of electrical components, including an electronic drive system, included in the toy ride-on vehicle of FIG. 1.

As a more specific example, the electronic drive system 402 may estimate, based on the current through the motors in the motor assembly 186, the wheel speed (i.e., indirectly determine the wheel speed). Stated differently, the electronic drive system 402 may measure the current through the motors in the motor assembly 186 (at the outputs of a dual H-bridge, which is illustrated in FIG. 11) using, for example, a current sensing resistor. Based on the measured currents, voltages, and a known or measured motor resistance, the electronic drive system 402 performs electromotive force (EMF) calculations to determine the speeds of the motors 188, 190, and 194 in the motor assembly 186 and, accordingly, determine the speed of the wheel(s) associated with each of the motors.

Still referring to FIG. 10, the electronic drive system 402 may also include or be coupled to one or more user input devices 406 and a battery assembly 450. The input devices 406 convey user inputs to the controller 404 via a wiring harness 408 included in the vehicle 10 and may impact the operation of the motor assembly 186, such as by causing the actuation (or energization) of at least portion of the motor assembly 186, selecting between a range of electronic configurations, selecting the direction of rotation of the output of the motor assembly 186, selecting a maximum rate of rotation to which the motor assembly 186 may be actuated, etc. For example, the drift switch 174 included on the steering wheel 172 may impact the operations of the motor assembly 186 to initiate a drift or slide (the operations associated with actuation of the drift switch 174 are described below in connection with FIG. 11). Additional examples include a shifter 183, an on/off switch 184 (despite not being shown in FIGS. 1-9) and various proportional control drive actuators, such as a foot pedal 182.

Proportional control drive actuators provide "proportional control" because the actuators are configured have multiple input levels (i.e., are analog, rather than digital inputs). Stated differently, a proportional control drive actuator in accordance with embodiments of the present invention is configured to provide an indication of the amount/degree that the associated moveable component has been activated by a user (child) of the toy vehicle 10. The amount that the moveable component of a proportional control drive actuator has been activated can then be used to set a speed of the toy vehicle motor(s). Additionally, although not shown in FIGS. 1-9, examples of proportional drive actuators a include foot pedal 182, one or more throttle levers, a rotational handgrip on a steering mechanism that includes a handlebar, joystick, or other moveable/actuatable component/mechanism.

Moreover, although not shown, in at least some embodiments, the vehicle 10 may include a user interface and any drive actuators, as well as any other user input/control devices that covey inputs from a user (i.e., a child sitting on seat 104, a parent/caregiver (for example via remote control), etc.) to the electronic drive system 402 or provide information to the user, may be included in the user interface. For example, a user interface may provide a speed interface that allows a user (i.e., a parent) to set the speed and/or acceleration of the vehicle 10 and a battery "gauge" that displays the charge remaining in battery assembly 450

The battery assembly 450 may include at least one battery adapted to provide power for the vehicle 10. Any suitable rechargeable or disposable battery or batteries may be used as part of the battery assembly 450 (i.e., one or more six-volt, twelve-volt, eighteen-volt or twenty-four-volt batteries). In one specific arrangement, the battery assembly 450 includes a single twelve-volt rechargeable battery.

Now turning to FIG. 11, a high-level schematic 460 illustrates the electrical connections between the electronic drive system 402 and the motor assembly 186 (including motors 188, 190, and 194). As is shown, the three motors 188, 190, and 194 are connected to two H-bridges ("Motor Drive 1" and "Motor Drive 2") on an energy management unit 450 ("EMU," which is the a main drive board) of the electronic drive system 402.

Figure 12:
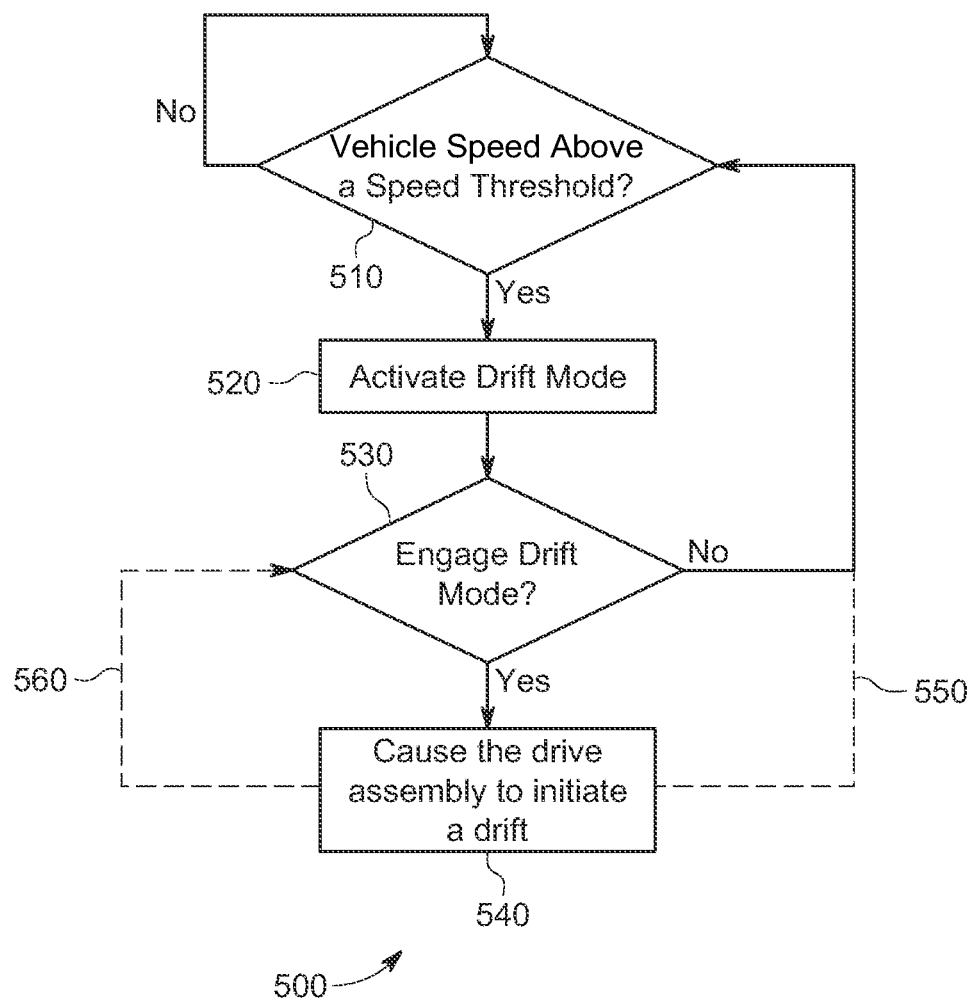
FIG. 12 is a high-level flowchart depicting operations performed by the electronic drive system included in the toy-ride on vehicle of FIG. 1 to initiate a drifting motion.

FIG. 12 is a high level flow chart 500 that illustrates operations of the electronic drive system 402 to cause the vehicle 10 to initiate a drift (i.e., operations that cause the vehicle 10 to begin to slide). Initially, at step 510, the electronic drive system 402 determines whether the vehicle 10 is traveling above a speed threshold. The speed threshold may be any acceptable speed, such as 3 miles per hour. If the vehicle 10 is traveling at a speed above the speed threshold, as determined by the electronic drive system 402 in the manner briefly described above and described in detail in U.S. Patent Application Publication No. US 2016/0296848 A1, the electronic drive system 402 activates drift mode as a driving mode option at step 520. The electronic drive system 402 does not automatically initiate a drift when the speed of the vehicle 10 is determined to be above the speed threshold. Instead, the electronic drive system 402 activates drift mode as a possible driving mode. In essence, the switch 174 included on the steering wheel 172 is available for activation. In order to indicate that the switch 174 is operational, a light indicator (i.e., a light emitting diode (LED)) may begin to flash, turn on, turn off, or provide some indication to the user. The light indicator may be included in the switch 174, on the steering wheel 172, or on any other portion of the vehicle 10 (i.e., a dashboard or user interface).

If, instead, the electronic drive system 402 determines, at step 510, that the vehicle 10 is traveling below the speed threshold, the electronic drive system 402 may continue monitoring the speed of the vehicle 10. The speed threshold is used to activate the drift mode because drifting may not be entertaining (or possible) at some low speeds. For example, at speeds below the speed threshold, drift mode may simply stop the vehicle 10 instead of causing the vehicle to enter a drift (i.e., slide out).

At step 530, the electronic drive system 402 determines whether a drift should be engaged (i.e., initiated) by determining whether a user is requesting a drift. That is, the electronic drive system 402 determines whether the switch 174 is actuated. When the user is actuating switch 174, the user is requesting the initiation of a drift and the electronic drive system 402 causes the drive assembly to enter into a drift at step 540. In particular, the electronic drive system 402 electronically freezes the motor associated with the rear wheel 302 (i.e., motor 188) and opens the circuit to the front motors (i.e., motors 190 and 194) so that wheels 316 and 336 can rotate freely. Electronically freezing the rear motor 188 simulates hard-on braking which causes the rear wheel 302 to skid. Meanwhile, when front wheels 316 and 336 can rotate freely (i.e., without drag from the drive assembly), the vehicle can pivot 10 on one of the front wheels 316 and 336. Consequently, if a child actuates switch 174 during a turn, the vehicle 10 will drift through the turn (causing the rear end of the vehicle to kick out). If, instead, a child actuates switch 174 while driving straight, the vehicle 10 may slide out, at least a little, and begin to turn (i.e., begin to drift).

In some embodiments, the electronic drive system 402 may initiate a drift of a certain predetermined length when initiating a drift at step 540. In these embodiments, the operations of the electronic drive system 402 may revert to step 510 after initiating a drift at step 540 (as indicated at 550). In alternate embodiments, the electronic drive system 402 may only drift for as long as the switch 174 is actuated. Consequently, the operations of the electronic drive system 402 may revert to step 530 after some predetermined time interval of drifting, as indicated at 560.

The vehicle 10 presented herein provides a number of advantages. Most notably, the tilting and drifting provide new and interesting features that increase the entertainment and play value of a ride-on toy vehicle. Additionally, the mechanisms utilized to provide these features can be incorporated with few or no additional components as compared to conventional ride-on toy vehicles and, thus, may efficiently provide new and interesting features in terms of cost and manufacturing time. Still further, the tilting provided by the font wheel assembly may allow the toy ride-on vehicle to make tighter turns during operation. These tight turns may be necessary or beneficial to allow for drifting. Consequently, the titling and drifting may be mutually beneficial.

The various components of vehicle 10 may be fabricated from any suitable material, such as plastic, foamed plastic, flexible plastic, one or more layers of fabric, wood, cardboard, pressed paper, metal, or any combination of materials. A suitable material or combination of materials may be selected to provide a desirable synergy of weight, strength, durability, cost, and/or manufacturability.

Although the disclosed inventions are illustrated and described herein as embodied in one or more specific examples, it is nevertheless not intended to be limited to the details shown, since various modifications and structural changes may be made therein without departing from the scope of the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

It is to be understood that terms such as "left," "right," "top," "bottom," "front," "rear," "side," "height," "length," "width," "upper," "lower," "interior," "exterior," "inner," "outer" and the like as may be used herein, merely describe points or portions of reference and do not limit the present invention to any particular orientation or configuration. Further, terms such as "first," "second," "third," etc., merely identify one of a number of portions, components and/or points of reference as disclosed herein, and do not limit the present invention to any particular configuration or orientation.

What is claimed is:

1. A ride-on toy vehicle comprising:
   a main body that defines a riding space sized to accommodate at least one child;
   a steering assembly including a drift switch;
   a front wheel assembly that is coupled to, but angularly offset from the main body so that steering the ride-on toy vehicle into a turn with the steering assembly creates a camber angle in wheels of the front wheel assembly and tilts the main body into the turn;
   a rear wheel assembly including a wheel that is coupled to the main body; and
   a drive assembly configured to drive the ride-on toy vehicle and selectively initiate a drift, wherein the drift switch can be actuated to initiate the drift when the ride-on toy vehicle is traveling at a speed that exceeds a drift mode threshold.

2. The ride-on toy vehicle of claim 1, wherein the wheels of the front wheel assembly comprise two wheels and the wheel of the rear wheel assembly is configured to tilt with the main body.

3. The ride-on toy vehicle of claim 1, wherein the drive assembly drives the ride-on toy vehicle by driving one or more of: (1) a first wheel of the wheels included in the front wheel assembly; (2) a second wheel of the wheels included in the front wheel assembly; and (3) the wheel included in the rear wheel assembly.

4. The ride-on toy vehicle of claim 1, wherein the drive assembly initiates the drift by:
   selectively locking out the wheel included in the rear wheel assembly while freeing the wheels included in the front wheel assembly to rotate freely.

5. The ride-on toy vehicle of claim 1, wherein the steering assembly further comprises:
   a steering column, the front wheel assembly being oriented nearly perpendicularly to the steering column.

6. The ride-on toy vehicle of claim 1, wherein the front wheel assembly further comprises:
   a beam that is angularly offset from and fixedly coupled to the main body.

7. The ride-on toy vehicle of claim 6, wherein the front wheel assembly further comprises:
   a first linkage pivotally coupled to a first end of the beam; and
   a second linkage pivotally coupled to a second end of the beam, wherein the first linkage and the second linkage pivotally couple the wheels to the beam.

8. The ride-on toy vehicle of claim 7, wherein:
the first linkage is pivotally coupled to the beam on a first axis that extends orthogonally through the beam; and
the second linkage is pivotally coupled to the beam on a second axis that extends orthogonally through the beam.

9. The ride-on toy vehicle of claim 7, wherein the steering assembly further comprises:
a steering linkage that mechanically links the first linkage to the second linkage so that the first linkage and the second linkage pivot about the beam in a linked manner.

10. The ride-on toy vehicle of claim 9, wherein steering the ride-on toy vehicle into the turn pivots the first linkage and the second linkage in the linked manner, creating the camber angle in the wheels of the front wheel assembly, which causes the beam and the main body to tilt into the turn.

11. A ride-on toy vehicle comprising:
a main body that defines a riding space sized to accommodate at least one child;
a chassis that is fixedly coupled to the main body;
a rear wheel assembly including a rear wheel; and
two front wheels, each of the two front wheels being rotatable through two planes with respect to the chassis, including:
a riding plane that allows the two front wheels to rotate along a riding surface; and
a second plane that is offset from the riding plane and allows the two front wheels to camber in or out to tilt the chassis and the main body into a turn;
a motor assembly configured to drive one or more of the rear wheel, a first wheel of the two front wheels, and a second wheel of the two front wheels;
an electronic drive system configured to control the motor assembly and selectively initiate a drift and
a drift switch that can be actuated to initiate the drift when the ride-on toy vehicle is traveling at a speed that exceeds a drift mode threshold.

12. The ride-on toy vehicle of claim 11, wherein the rear wheel is only rotatable in the riding plane with respect to the chassis.

13. The ride-on toy vehicle of claim 11, wherein tilting the chassis and the main body into the turn moves a center of gravity of the ride-on toy vehicle towards the turn.

14. The ride-on toy vehicle of claim 11, wherein the electronic drive system initiates the drift by:
electronically freezing a first motor of the motor assembly to lock out the rear wheel; and
opening circuitry to a second motor and a third motor of the motor assembly so that that the first wheel and the second wheel of the two front wheels rotate freely.

15. A ride-on toy vehicle comprising:
a main body that defines a riding space sized to accommodate at least one child;
a rear wheel assembly including a first wheel;
a front wheel assembly including a second wheel and a third wheel that are configured to camber in mirrored synchronization to tilt the main body into turns;
a motor assembly configured to drive one or more of the first wheel, the second wheel, and the third wheel; and
an electronic drive system configured to control the motor assembly and selectively initiate a drift by:
electronically freezing a first motor of the motor assembly to lock out the first wheel; and
opening circuitry to a second motor and a third motor of the motor assembly so that that the second wheel and the third wheel rotate freely.

16. The ride-on toy vehicle of claim 15, wherein:
the first motor is configured to selectively drive the first wheel based on first signals from the electronic drive system;
the second motor is configured to selectively drive the second wheel based on second signals from the electronic drive system; and
the third motor is configured to selectively drive the third wheel based on third signals from the electronic drive system.

17. The ride-on toy vehicle of claim 15, wherein, in the selectively initiating of the drift, the electronic drive system is configured to:
monitor a vehicle speed of the ride-on toy vehicle;
activate a drift mode when the vehicle speed satisfies a threshold; and
upon entering the drift mode, initiate the drift in response to a user actuation.

* * * * *